March 6, 1962  F. S. TURNER  3,023,691
COFFEE MAKER
Filed Jan. 18, 1960
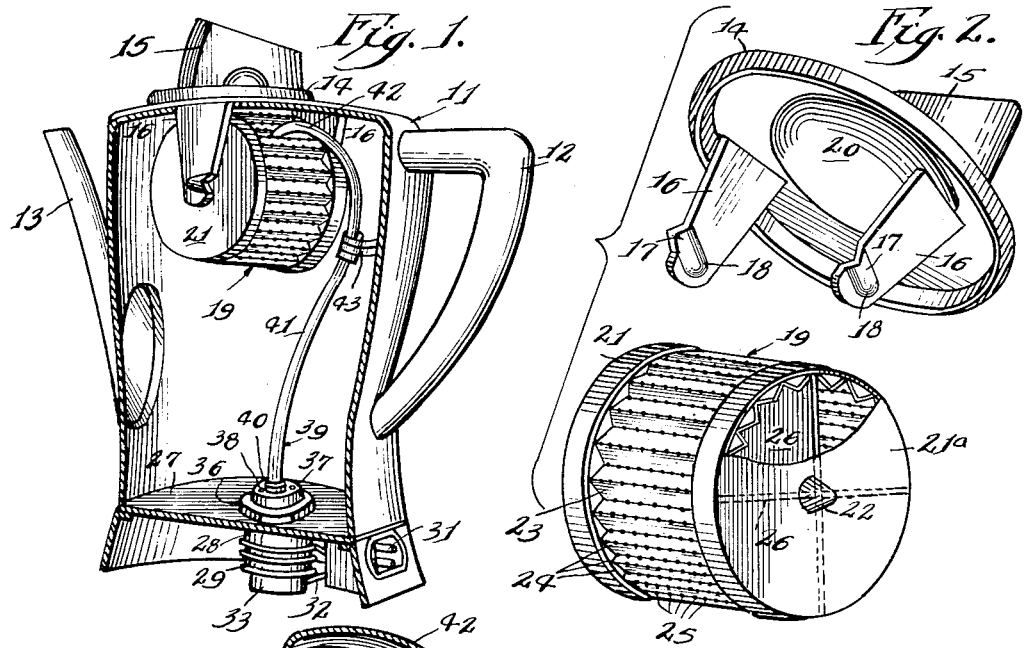
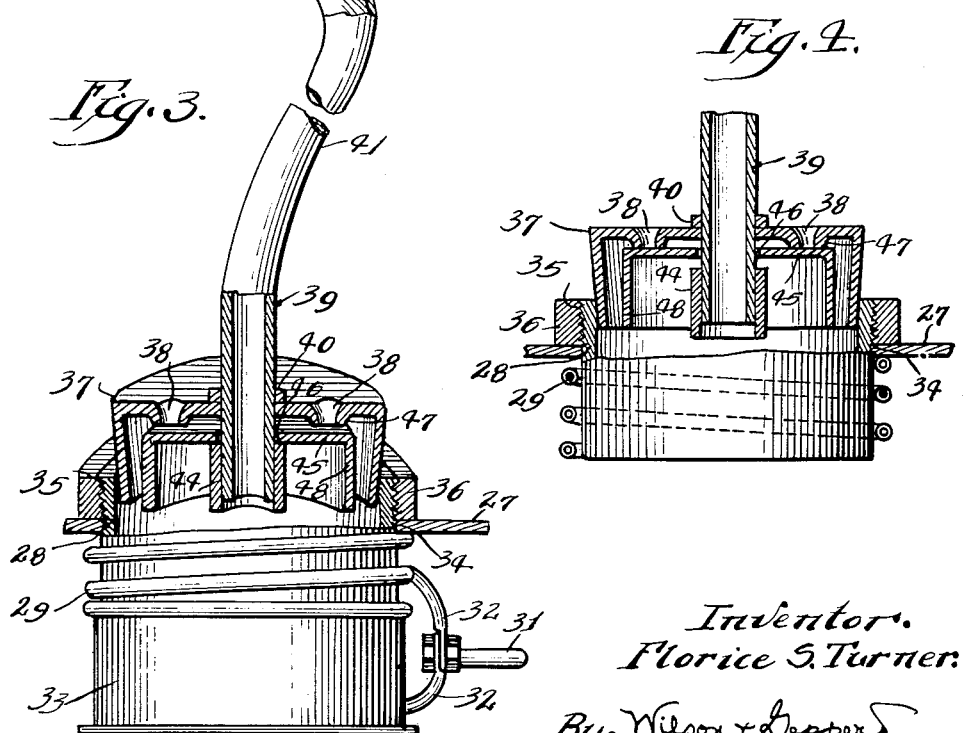
Inventor:
Florice S. Turner
By Wilson + Pepper
Attorneys.

United States Patent Office 3,023,691
Patented Mar. 6, 1962

3,023,691
COFFEE MAKER
Florice S. Turner, R.R. 2, Stoughton, Wis.
Filed Jan. 18, 1960, Ser. No. 3,188
8 Claims. (Cl. 99—287)

The present invention relates to a new and novel apparatus for making beverages and more particularly to a novel device for brewing coffee. The apparatus heats the water and projects a stream of heated water against and rotates a novel container for the ground coffee, said assembly providing for a more efficient percolating process where a maximum amount of contact and mixing of the heated or boiling water and the ground coffee is effected.

To be acceptable to the average consumer, a brewing apparatus must be capable of producing a beverage of high strength and optimum flavor per unit of grindings but not extract the bitterness along with the flavor. The present invention accomplishes this objective by promoting a more uniform and effective circulation of the heated or boiling liquid through the ground coffee.

An important object of the present invention is the provision of a novel coffee or beverage percolator which will give the most efficient circulation of the boiling water to the grindings. This is accomplished through the provision of a curved delivery tube leading from the heating well to the container for the grindings. The curved tube terminates at its upper end in a delivery spout which directs the stream of hot water directly and forcibly onto the grindings contained in a perforated and vaned receptacle, the latter being caused to rotate by impingement of the ejected stream of water and thereby uniformly and continuously expose all portions of the contained grindings. This type of percolating device has numerous advantages over the usual vertical delivery tube where the distribution of the hot water over the grindings is not uniform and may lead to areas where little extraction or over-extraction has occurred.

Another object of the present invention is the provision of a perforated and fluted container adapted to hold and retain the grindings, the container being mounted at or near the top of the percolator. This novel container is mounted to freely rotate with its axis of rotation being in a substantially horizontal plane. This container has openings in its sides to allow water from the spout of the curved delivery tube to effectively mix with the grindings thus brewing the desired beverage.

A further object of the present invention is the provision of a receptacle holding the grindings or ground coffee and caused to rotate by the water discharged from the curved delivery tube or spout impinging on the exterior of the container and entering into the contents of the receptacle. The rotation of the perforated receptacle and the passing of water therethrough produces an improved mixing and circulating action resulting in a most complete and uniform brewing of the grindings into the desired beverage.

The present invention further comprehends the provision of vanes on the exterior of the perforated receptacle with the openings to the interior of the receptacle located on the ridges and depressions of the vanes, said vanes producing rotary motion of the receptacle resulting from the impact of the hot water issuing from the spout of the delivery tube onto the surfaces of the vanes.

The present invention further comprehends the provision of a new and novel mounting means or bracket on the removable top of the beverage pot which rotatably supports the container for the grindings. This bracket depends from the underside of the top or closure and removably retains the container during brewing, but permitting the latter to be readily removed for emptying of the grounds and refilling for a new brewing operation.

Another object of the present invention is the provision of a novel non-return valve mounted in the heating well of the pot or percolator. This valve is an inverted cup washer mounted for limited vertical movement on the delivery tube base, said washer providing for a more efficient delivery of hot water through the delivery tube to the rotating container housing the grindings.

Further objects are to provide a construction of maximum simplicity, efficiency, economy and ease of assembly and operation, and such further objects, advantages and capabilities as will later more fully appear and are inherently possessed thereby.

In the drawing:

FIGURE 1 is a perspective view taken on a vertical cross section through the percolator or coffee maker and showing the component parts in operative position, including the relation of the heating well, the curved delivery tube and the rotatable container for the grindings.

FIG. 2 is an exploded or disassembled view in perspective of the top to the coffee maker and its container and disclosing in detail the construction of the container and its mounting bracket.

FIG. 3 is a view of the heating well and the curved delivery tube taken partly in vertical cross section to show the construction of the interior of the heating well, its valve and of the delivery spout.

FIG. 4 is an enlarged view partly in vertical cross section of the heating well showing the non-return valve in closed position.

Referring particularly to the drawing and the illustrative embodiment of the invention shown therein, a beverage percolator or coffee pot 11 is shown in FIG. 1 having a handle 12, a pouring spout 13 and a removable top 14. The top 14 also has a handle 15 formed of a material which is a poor conductor of heat, so that the top may be handled during the brewing operation. The top is also provided with a glass or transparent insert 20 to permit viewing of the brewing operation.

The top 14 is constructed with two downwardly extending or depending substantially parallel arms 16 which form a support bracket for mounting the container 19 which houses the grindings. Each arm 16 has an inwardly opening channel 17 which extends in an upwardly slanted direction from a central depression or pivotal mounting 18 to the edge of the arm in the manner shown. Each channel 17 opens inwardly toward the center of the pot and both channels extend in the same direction and are aligned so that the container 19 is removably suspended on the arms 16 during a brewing operation.

The container 19, which houses the grindings for brewing, has two circular end plates 21 and 21ª, the latter being frictionally mounted thereon for ready removal. Each end plate has a central projection or pivot 22 which is received in a groove or channel 17 and rotates in a depression 18. The body portion 23 of the container 19 is generally cylindrical in shape and is composed of a series of vanes of fins 24, the ridges of the vanes 24 forming the exterior limit of the container. To allow the hot water to gain access to the interior of the container, a plurality of relatively closely spaced openings 25 are formed on the ridge of each vane and at the depressions or junctions of adjacent vanes. Intersecting plates 26 divide the interior of the container 19 into plural compartments receiving a proportionate amount of the grindings to be brewed and the hot water projected through the openings 25 during each revolution of the container.

Referring to FIG. 1, the pot 11 contains a bottom plate 27 below which is mounted a heating well 28 and a heating coil 29. A socket 31 in the wall of the pot 11 provides a connection to an outside electrical source.

Leads 32 from the socket 31 are connected with the heating coil 29 and a control box 33 which contains a thermally actuated switch (not shown) to control the amount of heat delivered through the coil.

The heating well 28 extends up through an opening 34 in the bottom plate 27 and terminates in external screw threads 35. A nut 36 is threadedly engaged with the external threads 35 to attach the heating well 28 to the pot 11. An inverted cup-shaped cover 37 for the heating well 28 fits within the top of the well 28 to enclose the well except for openings 38 in the top of the cup-shaped member. Affixed to and extending through said cover 37 by a collar 40 at the center thereof is a delivery tube 39 which is vertical adjacent the heating well 28 and is curved toward the rear of the pot 11 at 41 and then is curved forwardly terminating in a delivery spout 42. A laterally opening hook-shaped member 43 is mounted on the wall of pot 11, within which hook the delivery tube 39 is engaged to hold the delivery tube in proper operative position during brewing.

The spout 42 is shaped to give a fan-shaped pattern for the water issuing from the tube 39 so as to project the heated water over the length of the vanes 24 on the container 23. The heating coil 29 is preferably embedded in or surrounded with insulation (not shown) which is common practice to prevent the excessive escape of heat during the brewing operation.

A sleeve 44 is secured to the end of the delivery tube 39 which extends through the cup-shaped cover 37. This sleeve is vertically spaced from and below the internal surface of cover 37 to leave space for limited vertical movement or reciprocation of a valve member 45. The valve 45 is an inverted cup washer with a central opening 46 through which the tube 39 extends. The valve abuts the sleeve 44 at its lower limit of travel and abuts the downwardly flared edges 47 of the openings 38 formed in the cover 37 at the upper limit of travel to close these openings. The downwardly extending sides 48 of the valve 45 are of a smaller diameter than the internal diameter of the heating well 28 to provide an annular space therebetween.

The operation of the device will now be described. To produce a desired beverage, the grindings for that beverage, such as ground coffee, are placed in the divided compartments formed by the intersecting panels 26 in the rotatable container 19 upon removal of the one end plate 21ª. The end plate 21ª is replaced and the container is mounted on the top 14 of pot 11 with the projections 22, 22 mounted in the depressions 18, 18 formed on the arms 16, 16. When so mounted, the container 19 is free to revolve.

The required amount of water is placed in the pot 11, the top 14 is affixed and an electric cord is inserted into socket 31 with the opposite end of the cord connected to any suitable electrical source. The heating coil 29, as controlled by the control box 33, heats the water in the heating well 28 and the bottom of the pot 11. While the water is heating, the pressure of the water in the pot forces the valve 45 to remain in its lower position allowing water to enter the heating well 28. As the temperature of the water in the heating well approaches the boiling point, bubbles of vapor will appear and rise to the undersurface of valve 45 thus increasing the pressure in the heating well 28. When the pressure becomes sufficiently high, the valve will be forced upward thereby closing the openings 38 and allowing the heated water under pressure to escape only through the delivery tube 39. Heated water will escape through this tube until the pressure in the well 28 is less than the hydrostatic pressure of the water in the pot 11, at which time the valve will move downward allowing water to again enter the well through the openings 28. This operation will automatically continue cycling until the heat is reduced when brewing has been completed by the thermostatic control in a manner well known in the art. Prior to the initial closing of valve 45, the bubbles of vapor can escape through the openings 38 and circulate through the water in the pot 11 whereby to enhance the heating of contents of the pot.

When the water issues from spout 42 of the delivery tube 39, it issues in a fan shape and impinges downwardly along the length of the vanes 24 of container 19, enters through the openings 25 and contacts the grindings. The force of the water and its direction of impingement upon the vanes 24 causes rotation of the container 19. As the container rotates, the water enters the compartments of the container 19 and contacts the grindings in each compartment. As the container continues to revolve, the heated water and brew being prepared escapes through the openings 25 by gravity and rejoins the water and brew in the body of the pot 11. Due to the rotation of the container 19 and the entrance and exit of the water and brew being prepared through the openings 25, the water and the grindings are subjected to a greater and more uniform and efficient contact and mixing action than in prior forms of percolators.

It will be apparent that I have disclosed a new and novel beverage brewing apparatus, and I do not wish to be limited by this disclosure but include all equivalents in the invention which are inherent in this disclosure and the appended claims.

Having thus disclosed the invention, I claim:

1. Apparatus for making beverages comprising a pot providing an outer container for liquid, having a removable top closure, a heating well communicating with said outer chamber, heating means surrounding said well, valve means in said heating well permitting liquid to flow into said well by gravity when the pressure in the well is low, delivery means mounted in said outer container and leading from said well to a point adjacent the top of the outer container, and an inner container for grindings of the beverage, said inner container being rotatably mounted below said top in position for impingement of the heated liquid from said delivery means upon and rotating said inner container.

2. Apparatus for making beverages as set forth in claim 1, in which said delivery means is a curved tube having one end terminating in the heating well and the other end terminating in a spout adjacent the inner container.

3. Apparatus for making beverages as set forth in claim 1, in which said inner rotatable container is provided with horizontal vanes upon which the heated liquid issuing from said delivery means impinges and causes rotation of said inner container.

4. Apparatus for making beverages as set forth in claim 1, in which a plurality of openings are formed on the sides of the inner rotatable container for the passage of heated liquid from said delivery means into and out of the interior of said rotatable container.

5. Apparatus for making beverages as set forth in claim 1, in which said heating well has a closure provided with one or more openings and a delivery tube projecting through said closure and providing the delivery means from said well, said valve means comprising an inverted cup-shaped washer fitted over the end of said delivery tube and having limited reciprocation to intermittently seal off said openings between said heating well and said outer container.

6. Apparatus for brewing coffee comprising an outer container having a removable closure, a heating well in the bottom of and communicating with the outer container through one or more openings in the top of said heating well, heating means surrounding said well, an inverted cup-shaped valve housed in said heating well so as to close the communicating openings when the pressure rises in said well, a curved delivery tube removably mounted in said outer container with one end of said tube terminating in said heating well, the other end of said delivery tube terminating in a delivery spout adjacent the top of said outer container, depending arms mounted on said removable closure and extending downward into the container, said arms having depressions adjacent their lower ends and an inner container for receiving ground coffee rotatably mounted on said arms and provided with end plates one of which is removable, each of said end plates having a central projection received in a depression in a depending arm to allow free rotation of said inner container, said inner container being positioned adjacent to and rotated by the liquid issuing from said delivery spout.

7. Apparatus for brewing coffee as set forth in claim 6, in which said inner container is formed with a plurality of external horizontal vanes upon which hot liquid delivered from said delivery spout impinges causing rotation of said inner container, said vanes having a plurality of openings for entrance and exit of the heated liquid.

8. Apparatus for brewing coffee as set forth in claim 6, including means in said outer container for detachably mounting said curved delivery tube for directing the heated liquid downwardly against the vanes of the inner container for rotating the latter.

References Cited in the file of this patent

UNITED STATES PATENTS

| | | |
|---|---|---|
| 1,668,454 | Hake | May 1, 1928 |
| 2,898,842 | Huck | Aug. 11, 1959 |